United States Patent Office 3,522,477
Patented Aug. 4, 1970

3,522,477
BI-ELEMENT CIRCUIT BREAKER FOR MOTOR CONTROL CIRCUIT
Dudley D. Nye, Jr., Fort Lauderdale, Fla., assignor to Airpax Electronics, Incorporated, Cambridge, Md., a corporation of Maryland
Filed Mar. 1, 1968, Ser. No. 709,668
Int. Cl. H02h 7/085
U.S. Cl. 317—13      20 Claims

ABSTRACT OF THE DISCLOSURE

An electric motor protection arrangement comprising an electric motor, a power line, a rectifying type motor controller coupling power from the power lines to the motor field windings and armature, the improvement comprising a circuit breaker to interrupt power transmission from the line to the armature in response to armature current inceasing above a rated D.C. trip point and including means for maintaining the value of the trip point substantially constant and independent of motor speed.

BACKGROUND OF THE INVENTION

This invention relates to a two coil magnetic circuit breaker in conjunction with Silicon Controlled Rectifier D.C. Motor Control System. The two coils are connected in the circuit such that the ultimate trip point with respect to the D.C. armature current of the motor is essentially constant and independent of speed. The torque output of the motor is determined by the D.C. armature current.

Magnetic circuit breakers are basically RMS responsive devices. Except for cases having exceptionally high peak current values, the ultimate trip point depends on the RMS current regardless of the waveform.

When the A.C. power line is rectified by a Silicon Controlled Rectifier Circuit, the resulting direct current applied to the motor armature has relatively large ripple components due to the chopped sine wave nature of the wave form. The ripple components and the resulting total RMS values when the D.C. armature current or torque is held constant, are a funtion of motor speed. The A.C. line current also varies in RMS value with speed when the torque or D.C. armature current is held constant.

Therefore, when a conventional single coil magnetic circuit breaker is used in the power line or in the motor armature, the ultimate trip point with respect to D.C. armature current or torque will vary wtih speed. In both cases the D.C. armature current, which will ultimately result in the circuit breaker tripping, will increase as the speed decreases.

In the case of a typical industrial type D.C. motor and a single coil circuit breaker in the A.C. power line, the ultimate trip point with respect to D.C. armature current will approach 200% of rated load at locked rotor and will trip at 100% load at motor rated or base speed.

When the circuit breaker is in the armature circuit the ultimate trip point with respect to D.C. armature current is approximately 140% of rated load at locked rotor when it trips at 100% of rated load at full rated speed.

D.C. motors in general cannot supply rated torque as the speed is decreased since less air cooling occurs.

However, when the motor is sized to operate at full speed and full torque with SCR current pulses, the resulting RMS armature current is substantially less in the lower speed region of operation, when the torque or D.C. armature current is held constant. The corresponding reduced RMS heating in the armature tends to compensate for the reduction of air cooling. Thus, the two coil circuit breaker arrangement of the present invention, by providing a constant D.C. armature ultimate trip point, causes the maximum possible RMS armature current to be reduced at lower speeds. This provides considerably better motor protection over the full speed range than when single coil circuit breakers are used.

The principal object of the invention is to provide a circuit breaker for use with Silicon Controlled Rectifier D.C. Motor Controllers which provides a nearly constant ultimate trip point, with respect to D.C. armature current or torque, regardless of the motor speed setting.

Another object is to provide a circuit breaker in conjunction with an SCR motor controller with the power contacts and the main sensing coil in the incoming A.C. line, and at the same time provide a fixed ultimate trip point with respect to D.C. armature current regardless of the speed setting. This arrangement provides protection for short circuits in the controller circuit as well as for motor overloads.

A third and alternate object is to provide a circuit breaker in conjunction with an SCR motor controller with power contacts and the main sensing coil in the armature circuit of the motor and at the same time provide a fixed ultimate trip point with respect to the D.C. armature current regardless of the speed setting.

Another object is to provide a circuit breaker in conjunction with an SCR motor controller, which provides a nearly constant ultimate trip point with respect to D.C. armature current or torque, regardless of speed and in addition provides a circuit breaker time delay which decreases with increased overload.

Other objects and advantages of the invention will be apparent from the following detailed description, taken in connection with the accompanying drawings.

DETAILED DESCRIPTION OF THE EMBODIMENTS

Figure 1:
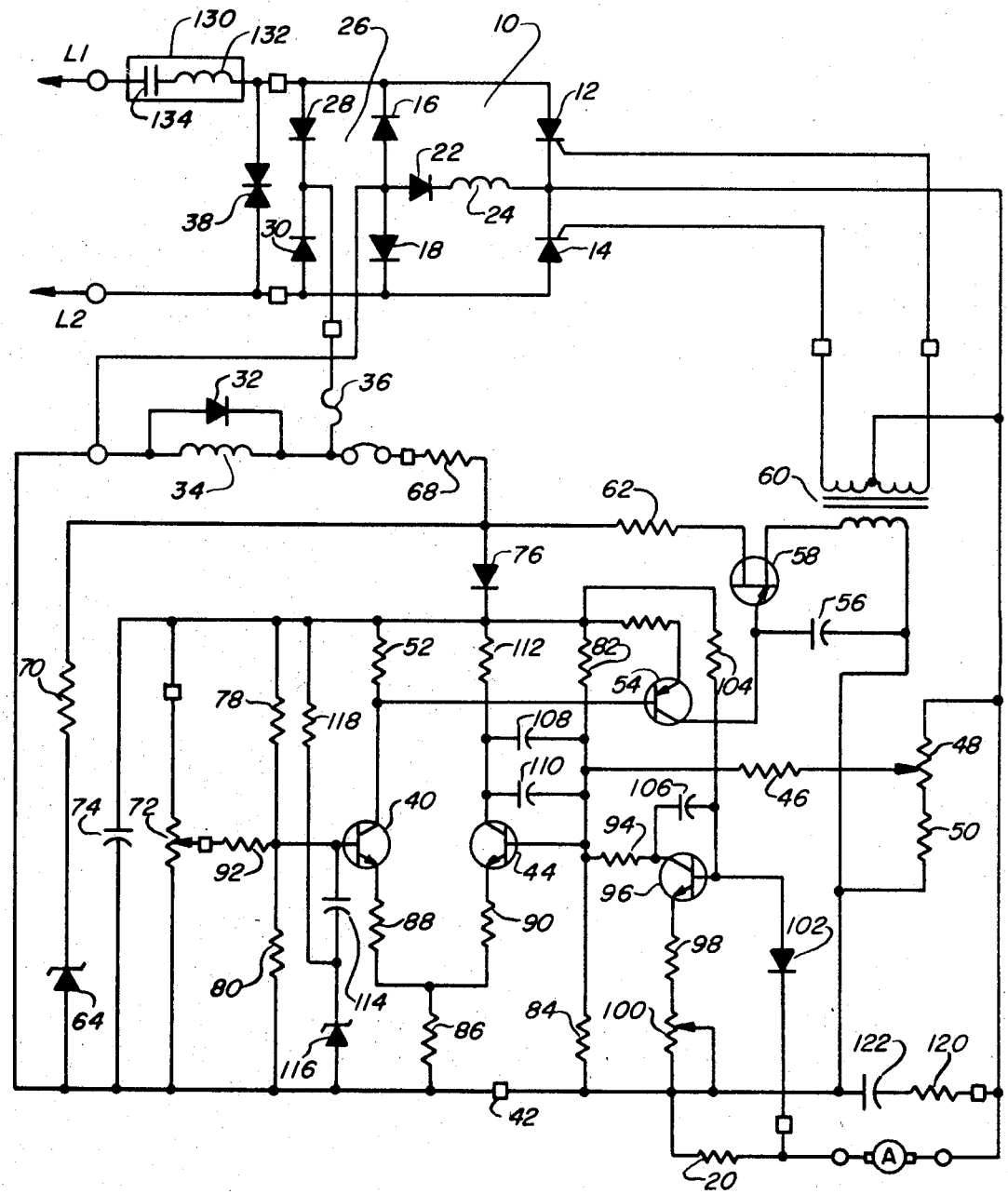
FIG. 1 is a schematic drawing showing a Silicon Controlled Motor Control Circuit including the present invention.

FIG. 1 illustrates an SCR Motor Controller Circuit embodying the invention comprising a Silicon Controlled Rectifier Bridge Circuit 10 including Silicon Controlled Rectifiers 12, 14 and diodes 16 and 18. The adjustable direct current output is applied to the D.C. motor armature via resistor 20 as shown. Resistor 20 is a small fraction of the resistance of the motor's armature, and serves to provide a voltage drop representative of the motor current. Diode 22 is connected across the motor armature with the circuit breaker compensating coil 24 connected in series as shown. This diode 22, called the free wheeling diode, provides a path for current established in the armature inductance which must have a path to flow after the SCR's have turned off.

The motor field supply is obtained from the bridge rectifier 26, comprising diodes 28, 30, 16 and 18.

Diode 32 across the motor field winding 34 provides a path for the current to flow from the motor field inductance if fuse 36 interrupts the circuit.

A selenium transient suppressor 38 is used across the incoming A.C. power lines to suppress and absorb transient current pulses entering the unit via the power line.

To obtain a control capability, the transistor circuit compares the armature terminal voltage to an adjustable reference voltage and provides Silicon Controlled Rectifier gate firing pulses phased to provide a terminal voltage to balance the reference voltages. The reference voltage measured from transistor 40 base to circuit common 42 is compared to the feedback voltage from the motor armature applied to transistor 44 base via 46, 48 and 50.

If the two base voltages become unbalanced there is a change of collector current in transistor 40. This causes a change in the voltage drop across 52. The voltage across 52 is applied to the base and emitter circuit of transistor 54 generally as shown and the resulting change of collector current in transistor 54 causes a change in the charging rate of capacitor 56. Thus there is a change of time for the voltage across capacitor 56 to reach the peak point or firing point of unijunction transistor 58. This results in a change in the phase of the firing pulses applied to the Silicon Controlled rectifiers via pulse transformer 60. When the transistor 58 fires, capacitor 56 is discharged into the primary of transformer 60. The unijunction transistor 58 is synchronized to the power line by utilizing as the drive the full wave rectified unfiltered voltage originally derived for the motor field. This voltage is applied to the transistor 58 bases via resistor 62 and the transformer 60 primary. When the synchronizing voltage goes to zero at the end of the line voltage cycle, the peak point or firing point of transistor 58 reduces to zero, causing capacitor 56 to discharge and to be ready to start charging at the beginning of the next half cycle of line voltage.

The Zener diode 64 clips the field voltage supply and the resultant voltage is applied to the electronic circuit via diode 66 and resistor 62. Resistor 68 limits the current when Zener diode 64 is conducting or clipping. Resistor 70 causes the regulating action of Zener diode 64 to be reduced such that the average value of the adjustable reference voltage applied to the base of transistor 40 via potentiometer 72 varies the proper amount to compensate for line voltage variation of the motor field supply.

Capacitor 74 filters the full wave rectified supply voltage and diode 76 prevents charge on capacitor 74 from holding the synchronizing full wave rectified voltage of transistor 58 above zero at the end of each half cycle.

Resistors 78, 80, 82 and 84 are used as voltage dividers to supply operating bias voltages to the bases of the differential amplifier comprising transistors 40 and 44. Resistor 86 provides coupling between transistors 40 and 44 and resistors 88 and 90 stabilize the gain of the differential amplifier configuration.

Resistor 92 feeds an adjustable reference current to transistor 40 base circuit. Resistor 46 feeds a current representing motor terminal voltage to the base circuit of transistor 44. Resistor 94 feeds a current representing armature current, to the base circuit of transistor 44. This current compensates for the drop in speed resulting from a voltage drop across the motor's armature resistance.

Transistor 96 senses the voltage drop across resistor 20 and repeats it across the emitter circuit comprising resistors 98 and 100, thus a corresponding collector current representing armature current flows in resistor 94. The amount of armature resistance compensation can be adjusted by resistor 100. Diode 102 temperature compensates the circuit for a change in base to emitter voltage of transistor 96 and also provides a regulated bias voltage for transistor 96 via resistor 104.

Capacitor 106 filters the pulsed current representing armature current before application to transistor 44.

Capacitors 108 and 110 reduce the response time of the differential amplifier 40 and 44 so as to provide closed loop system stability. Resistor 112 provides output signal to be fed back via capacitor 108 and 110.

Capacitor 114 prevents fast changes of the reference voltage when the reference potentiometer is changed and thus prevents large surge currents in the motor armature.

Zener 116 in conjunction with resistor 118 permits the base input voltage of transistor 40 to jump immediately to the zero speed value when first turning the unit on. This action eliminates a dead time between the time when the unit is turned on and when the motor starts to rotate.

Resistor 120 and capacitor 122 are series connected across the motor armature circuit to provide additional current in the Silicon Controlled Rectifiers when they are first gated on. This additional holding current prevents the SCR from turning off after removal of gate pulse, due to the relatively slow build up of current in the armature inductance. The resistor 120 and capacitor 122 network also suppresses voltage transients.

In operation, circuit breaker 130 with the main actuating coil 132 in the A.C. line together with the interrupting contacts 134 and the compensating winding 24 in series with the free wheeling diode 22, protects the motor and the controller. The circuit breaker with standard manual override is also used as an on-off switch.

The combination of the two coil circuit breaker 130 in conjunction with the motor controller circuit has an ultimate trip point, with respect to the D.C. armature current, which is essentially independent of the speed setting. This cannot be obtained by using a single coil breaker in either the A.C. line or the motor armature. In either case, since the form factor improves in the lowest speed range it takes more D.C. armature current to cause the circuit breaker to reach its RMS trip point.

The free wheeling diode 22 starts to conduct at about 1200 r.p.m. at full rated motor torque with a typical industrial 1750 r.p.m. D.C. motor. The current through diode 22 continues to increase as the speed is decreased as the torque or armature current remains constant. This current in the compensating winding 24 of circuit breaker 130 facilitates the tripping of the circuit breaker. The D.C. armature current does not have to build up to a higher than rated load value to trip the breaker 130 with this arrangement when the two windings have the proper number of turns.

The compensated breaker 130 provides an ultimate trip point within about ±2% of the rated D.C. armature current, from locked rotor to rated speed. The trip point with conventional breakers (i.e., without a compensated breaker connected according to the invention) approaches 200% of rated armature current under a locked rotor condition.

Figure 2:
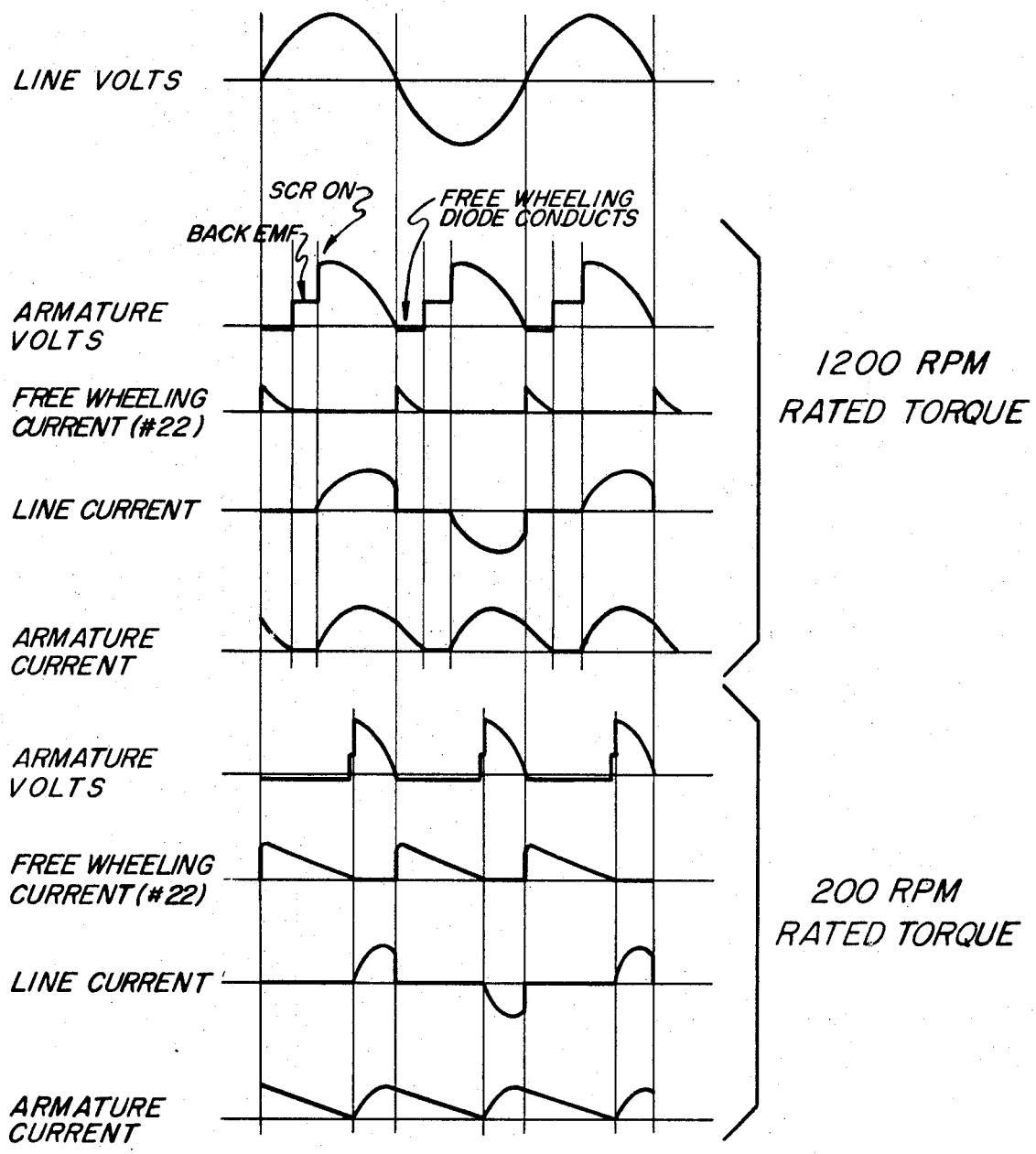
FIG. 2 shows the voltage and current wave forms within the circuit of FIG. 1.

Since current pulses in the free wheeling diode 22 occur when the Silicon Controlled Rectifiers are off, it is not necessary to observe polarity in the two coils 24 and 132 of circuit breaker 130. The SCR pulses of current flow through the line and the main winding of circuit breaker 130 and the free wheeling diode 22 pulse flow in the compensating winding 24, while the current pulses in the line are absent (see FIG. 2).

A constant torque load results in slightly less D.C. armature currents as the speed is reduced, since less torque is needed to operate the motor's fan. A slight increase in the turns on the compensating winding 24 will convert the circuit breaker 130 from a constant D.C. armature current trip point to a constant torque point. An alternate connection is with the main winding 132 of the circuit breaker 130 in series with the motor armature. In this case less compensation is needed since a single coil circuit breaker is connected in the armature which results in about 40% increase of the D.C. trip point at locked rotor instead of the 100% increase obtained in the original case as described above. In this alternate case, the current in the free wheeling diode 22 and the armature winding overlap with respect to time. It is then necessary to connect the compensating winding 24 to aid tripping and the connection at the circuit breaker 130 cannot be reversed.

The general design of the two coil compensated breaker utilizes, in the case of a ¾ H.P. 80 volt armature, 21 turns on the main coil 132 and 34 turns on the compensating winding 24. This is the requirement when the main coil 132 is in the A.C. line as shown in FIG. 1. Less compensation is needed when the main coil 132 is in series with the motor armature.

It should be understood that the embodiments hereinabove described are by way of example only and that various modifications can be made without departing from the spirit and scope of the invention. For example, SCR's 12 and 14 can be replaced by various equivalent three-terminal conventional devices such as thyratons or ignitrons with appropriate gate adapters and heater circuits. Moreover, the circuit breaker 130 can be replaced by a thermal circuit breaker or a fuse having a main heater element connected in correspondence with the main coil of breaker 130 and a compensating heater element connected in correspondence with the compensating coil of breaker 130. In the case of a thermal circuit breaker or fuse, the main and compensating elements preferably should be physically contiguous in the same sense that the primary and compensating coils of the breaker described above are wound on the same bobbin.

What is claimed is:

1. An electric motor protection arrangement comprising an electric motor, a power line, a free-wheeling rectifier motor controller coupling power from the power lines to the motor field windings and armature, the improvement comprising a circuit breaker to interrupt power transmission from the line to the armature in response to armature current increasing above a rated D.C. trip point and including means for maintaining the value of the trip point substantially constant and independent of motor speed.

2. The arrangement of claim 1 wherein the last-mentioned means includes a compensating element in series with the armature free-wheeling rectifier operable to trip the breaker in the event current at an excessive RMS value is passed by the rectifier.

3. The arrangement of claim 2 wherein said means further includes a primary element located in series with said power line to operate the breaker responsive to receiving excessive RMS current.

4. The arrangement of claim 3 wherein said elements are coils.

5. The arrangement of claim 4 wherein the primary and compensating coils are wound on the same bobbin.

6. The arrangement of claim 2 wherein said means further includes a primary element in series with the armature to operate the breaker in response to receiving excessive RMS current.

7. The arrangement of claim 6 wherein said elements are coils.

8. The arrangement of claim 7 wherein the primary and compensating coils are wound on the same bobbin.

9. An electric motor protection arrangement comprising an electric motor, a power line, a free-wheeling rectifier motor controller coupling power from the power line to the motor field windings and armature, the improvement comprising a circuit breaker to interrupt power transmission from the line to the armature in response to motor torque increasing above a rated value trip point and including means for maintaining the value of the trip point substantially constant and independent of motor speed.

10. The arrangement of claim 9 wherein the last-mentioned means includes a compensating element in series with the armature free-wheeling rectifier operable to trip the breaker in the event current with an excessive RMS value is passed by the rectifier.

11. The arrangement of claim 10 wherein said means further includes a primary element located in series with said power line to operate the breaker responsive to excessive RMS current.

12. The arrangement of claim 11 wherein the elements are coils.

13. The arrangement of claim 12 wherein the primary and compensating coils are wound on the same bobbin.

14. The arrangement of claim 10 wherein said means further includes a primary element in series with the armature to operate the breaker in response to receiving excessive RMS current.

15. The arrangement of claim 10 wherein the elements are coils.

16. The arrangement of claim 15 wherein the coils are wound on the same bobbin.

17. The arrangement of claim 3 wherein the elements are heater elements and the breaker is of the thermal type.

18. The arrangement of claim 11 wherein the elements are heater elements and the breaker is of the thermal type.

19. The arrangement of claim 3 wherein the elements are heater elements and the breaker is of the fuse type.

20. The arrangement of claim 11 wherein the elements are heater elements and the breaker is of the fuse type.

References Cited

UNITED STATES PATENTS

| | | | |
|---|---|---|---|
| 2,969,493 | 1/1961 | Dunigan | 318—450 X |
| 3,383,561 | 5/1968 | Thiele | 317—13 |

JAMES D. TRAMMELL, Primary Examiner

U.S. Cl. X.R.

317—33; 318—450